US010063375B2

(12) United States Patent
Thom et al.

(10) Patent No.: US 10,063,375 B2
(45) Date of Patent: Aug. 28, 2018

(54) ISOLATION OF TRUSTED INPUT/OUTPUT DEVICES

(71) Applicant: Microsoft Technology Licensing, LLC., Redmond, WA (US)

(72) Inventors: Stefan Thom, Snohomish, WA (US); Robert K. Spiger, Seattle, WA (US); David R. Wooten, Redmond, WA (US); Merzin Kapadia, Newcastle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 113 days.

(21) Appl. No.: 14/816,301

(22) Filed: Aug. 3, 2015

(65) Prior Publication Data

US 2016/0308677 A1  Oct. 20, 2016

Related U.S. Application Data

(60) Provisional application No. 62/150,090, filed on Apr. 20, 2015.

(51) Int. Cl.
*H04L 9/32* (2006.01)
*G06F 21/85* (2013.01)

(52) U.S. Cl.
CPC ............ *H04L 9/3234* (2013.01); *G06F 21/85* (2013.01); *G06F 2221/2141* (2013.01)

(58) Field of Classification Search
CPC . H04L 9/3234; G06F 21/85; G06F 2221/2141
See application file for complete search history.

(56) References Cited

U.S. PATENT DOCUMENTS

| 7,836,309 | B2 | 11/2010 | Holt et al. |
| 8,086,852 | B2 | 12/2011 | Bade et al. |
| 8,332,653 | B2 | 12/2012 | Buer |
| 8,375,221 | B1 | 2/2013 | Thom |
| 8,625,788 | B2 | 1/2014 | Pendakur et al. |
| 2003/0221030 | A1 | 11/2003 | Pontius et al. |
| 2007/0168574 | A1 | 7/2007 | Martinez et al. |
| 2008/0060068 | A1 | 3/2008 | Mabayoje et al. |
| 2008/0077993 | A1 | 3/2008 | Zimmer et al. |

(Continued)

OTHER PUBLICATIONS

Bryan Parno et al., "Bootstrapping Trust in Modern Computers", Springer, 2011, pp. 13-17.*

(Continued)

*Primary Examiner* — Meng Li
(74) *Attorney, Agent, or Firm* — Fogarty LLP

(57) ABSTRACT

Techniques are provided to ensure isolation of trusted input/output devices using a Secure Crypto-Processor. Secure IO lines may be used to drive devices that have a higher integrity requirement and to do attestation of sensor readings. Enhanced authorization policies may be used to enforce policies on interaction with IO devices. A bus master controller may also be provided in a Secure Crypto-Processor. Individual devices on an isolated Secure Crypto-Processor bus may be mapped to Indices so that read and write operations can be associated with Secure-Crypto-Processor-enforced authorization policies. The Secure Crypto-Processor may further provide means of attestation for complex data read from an input/output device that may be signed with the device identity to show strong origination proof of that data.

14 Claims, 5 Drawing Sheets

(56) References Cited

U.S. PATENT DOCUMENTS

| | | | |
|---|---|---|---|
| 2011/0016310 A1* | 1/2011 | Yong | G06F 21/57 |
| | | | 713/155 |
| 2013/0031374 A1 | 1/2013 | Thom et al. | |
| 2013/0326615 A1 | 12/2013 | Khanvilkar et al. | |
| 2014/0047229 A1 | 2/2014 | Wiseman | |
| 2014/0068275 A1 | 3/2014 | Swanson et al. | |
| 2014/0237220 A1 | 8/2014 | O'Rourke et al. | |
| 2015/0026426 A1 | 1/2015 | Sahita et al. | |
| 2015/0089586 A1 | 3/2015 | Ballesteros | |

OTHER PUBLICATIONS

Mulnix, David, "Intel® Trusted Execution Technology (Intel® TXT) Enabling Guide", Published on: Mar. 28, 2014 Available at: https://software.intel.com/en-us/articles/intel-trusted-execution-technology-intel-txt-enabling-guide, (19 pages).

"International Preliminary Report on Patentability Issued in PCT Application No. PCT/US2016/027450", dated Mar. 17, 2017, 10 Pages.

"International Search Report and Written Opinion," issued in PCT Application No. PCT/US2016/027450, dated Sep. 21, 2016, 18 Pages.

Parno, et al., "Bootstrapping Trust in Modern Computers", In Book-Bootstrapping Trust in Modern Computers Published in Springer-Verlag, Aug. 31, 2011, p. 16,19, 69.

Gebhardt, et al., "Ubiquitous Smart Home Control on a Raspberry Pi Embedded System", In the Eighth International Conference on Mobile Ubiquitous Computing, Systems, Sevices and Technologies, Dec. 31, 2014, pp. 172-177.

"Second Written Opinion Issued in PCT Application No. PCT/US2016/027450" dated Dec. 9, 2016, 8 Pages.

* cited by examiner

ISOLATION OF TRUSTED INPUT/OUTPUT DEVICES

CROSS-REFERENCE TO RELATED APPLICATIONS

This application claims the benefit of the filing date of U.S. Provisional Patent Application No. 62/150,090, which is titled "Isolation of Trusted Input/Output Devices" and was filed Apr. 20, 2015, the disclosure of which is hereby incorporated by reference herein in its entirety.

BACKGROUND

Security is a concern for any device that is connected to a public network, such as the Internet. Viruses, worms, Trojan horses, identity theft, software piracy, malicious attacks, and extortion using threats of data destruction are widespread. An operating system can provide numerous security features to guard against such attacks. However, the security features of an operating system are ineffective if the operating system itself has been corrupted, infected, or the victim of a malicious attack.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments discussed herein include systems and methodology for using Secure Crypto-Processor IO lines to drive devices that have a high integrity requirement.

Embodiments discussed herein include systems and methodology for using Secure Crypto-Processor IO lines to do attestation of sensor readings.

Embodiments discussed herein include systems and methodology for using enhanced Secure Crypto-Processor authorization policies to enforce policies on interaction with IO devices.

Embodiments discussed herein include systems and methodology for providing a bus master controller in a Secure Crypto-Processor.

Embodiments discussed herein include systems and methodology for mapping individual devices on an isolated Secure Crypto-Processor bus to Indices in the Secure Crypto-Processor so that read and write operations can be associated with enhanced authorization policies.

Embodiments discussed herein include systems and methodology allowing the Secure Crypto-Processor to provide means of attestation for complex data read from an input/output device that may be signed with the device identity to show strong origination proof of that data.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

In an Internet of Things (IoT) environment, any device may be assigned an address and coupled to other devices over the Internet thereby allowing the sharing of data and information among diverse entities. This allows independent, unrelated devices to exchange data, provide status information, receive control instructions, etc. The IoT "things" may include a seemingly limitless variety objects, such as household appliances, industrial equipment, traffic signals, vending machines, lighting systems, security systems, and the like. The expansion of connectivity to such a wide diversity of objects raises concerns that devices may be improperly accessed by unauthorized users or subject to malicious attacks.

Figure 1:
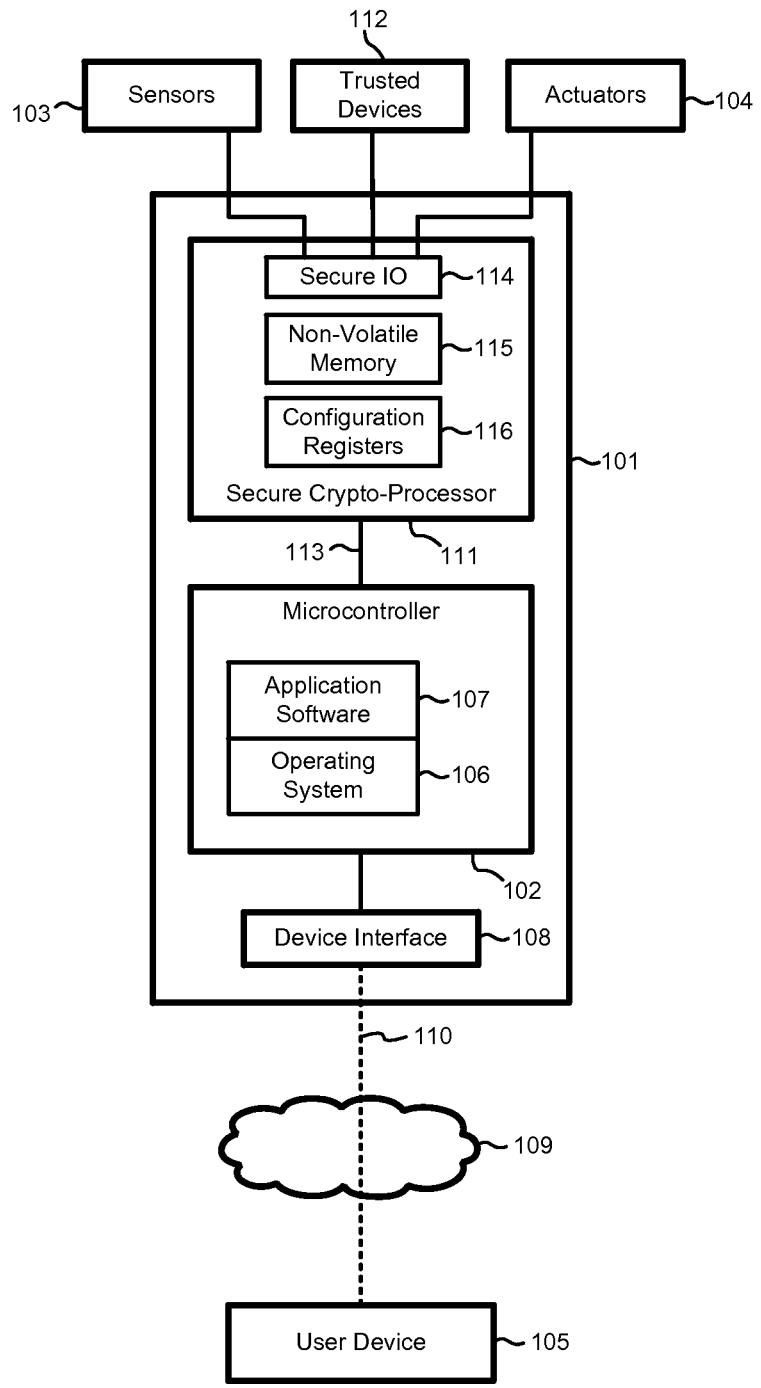
FIG. 1 illustrates one embodiment of a system for providing protection to network-accessible devices using a Secure Crypto-Processor.

FIG. 1 illustrates one embodiment of a system for providing protection to network-accessible devices using a Secure Crypto-Processor. The secure crypto-processor may be embodied in a hardware as a discrete component that can be coupled to a computing device, such as a microprocessor on a motherboard. Alternatively, the secure crypto-processor may be implemented as a firmware crypto-processor using software that is uploaded, flashed, or otherwise stored or written to the firmware or protected non-volatile memory of a computing device.

Device 101 comprises a microcontroller 102 that controls the device's operations, including managing information and commands exchanged with users, peripherals, and other devices. For example, under control of microcontroller 102, device 101 may collect data from one or more sensors 103, provide commands to one or more actuators 104, and/or exchange information with a user device 105. Sensors 103 may provide data, such as an on/off value, locked/unlocked indication, temperature, position, or any other status or measurement, associated with device 101, related peripherals, and/or the device's environment. Actuators 104 may represent any object, equipment, or function that can be controlled by device 101, such as a motor, lock, switch, light, indicator, or other equipment or machine that operates in multiple states or conditions.

Microcontroller 102 runs operating system software 106 that provides a platform for application software 107. Operating system 106 is initially loaded at start-up and manages all the other programs running on microcontroller 102. Users may interact with the operating system 106 through a user interface, such as a command language or a graphical user interface (GUI). Application software 107 makes use of the operating system 106 by making requests for services through a defined application program interface (API). For example, application software 107 may be configured to control or interact with input/output (IO) devices, such as sensors 103 and/or actuators 104. The IO devices may be integral to device 101 or, in other embodiments, may be external components.

User device 105 may interact with device 101 through a device interface 108. User device 105 may communicate with device 101 directly or indirectly. In one embodiment, user device 105 may be located remote from device 101 and may communicate with device 101 via any public or private network 109, such as the Internet, an intranet, a local area network (LAN), a wide area network (WAN), or the like. Communication channel 110 between user device 105 and device 101 may be carried across any combination of wired and/or wireless connections.

Secure Crypto-Processor 111 supports communications between microcontroller 102 and sensors 103, actuators 104, and/or other trusted devices 112. Microcontroller 102 and Secure Crypto-Processor 111 communicate via interface 113, such as a host bus in device 101. Secure Crypto-Processor 111 communicates with sensors 103, actuators 104, and trusted devices 112 via Secure IO 114. Secure Crypto-Processor 111 exposes Secure IO 114 pins that provide connections for sensors 103, actuators 104, and other trusted devices 112. The Secure IO pins are configured to provide data connections based upon policies enforced by Secure Crypto-Processor 111. Non-volatile (NV) memory 115 stores configuration data for use in communicating with peripheral devices using Secure IO 114.

The Secure IO pins are used to separate sensitive IO devices (e.g., sensors 103, actuators 104, and trusted devices 112) from microcontroller 102. This separation keeps sensitive or protected IO devices out of the reach of malware running on microcontroller 102 and/or unauthorized commands from user device 105, thereby preventing harm that may be caused by device 101. Secure Crypto-Processor 111 may enforce policies, such as requiring user passwords or public-key cryptography to access the IO devices. Secure Crypto-Processor 111 may further monitor the state of application software 107 and/or operating system 106 and allow interaction with the IO devices only if authorized versions are in use. Further policies are also possible, such as requiring device 101 to be maintained on a regular basis (for example, checking for patches installed). Device 101 will lose access to sensitive IO devices when Secure Crypto-Processor 111 no longer considers the device to be safe.

The pins from Secure IO 114 may be mapped into NV memory space 115 in Secure Crypto-Processor 111. NV Indices associated with the Secure IO pins may be configured to adhere to any policy that the manufacturer of device 101 deems necessary. These policies may be tied, for example, to an overall measurement of the system, a temporal restriction, exchange of a secret, possession of an asset, and the like. The microcontroller 102 codebase (e.g., operating system 106 and application software 107) offers a fairly large target for an attacker, but the Secure Crypto-Processor's attack surface is significantly smaller and more tightly defined. This means that if malware managed to break into the microcontroller 102, the malware would still have to satisfy the Secure Crypto-Processor 111 before any malicious or unauthorized commands could access the protected IO devices (e.g., sensors 103, actuators 104, and trusted devices 112). The policy for accessing protected IO device may be defined and statically configured into Secure Crypto-Processor 111. As a result, an infested microcontroller 102 has no capability to sidestep the policy defined in Secure Crypto-Processor 111 and, therefore, an attacker's ability to interact with the IO devices is limited.

In one embodiment, before sending sensor data, device 101 may utilize its strong identity and sign all sensor readings from the Secure Crypto-Processor. If a third party sends device 101 a request to provide sensor data, microcontroller 102 would be unable to send falsified data successfully because any made up sensor data would lack the required signature. Instead, the microcontroller 102 may simply not respond to an invalid request, which would raise warning flags on the user side. If the microcontroller 102—under control of malware—provides data that does not hold up to sensor attestation validation, then receipt of such a response would also raise warning flags at user device 105. Such occurrences may cause the user device 105 or third party recipient to schedule a maintenance cycle for device 101 to factory-reset the device and remove the malware infestation.

In an example use case, device 101 may be used in an electronic door control scenario wherein a sensor 103 detects whether or not a door is closed and an actuator 104 controls a door lock. Microcontroller 102 running software application 107 reads the sensor 103 values and determines a door status. Secure Crypto-Processor 111 is used to provide tamper-free access to the door. For example, Secure Crypto-Processor 111 may prevent false open/closed indications from being sent to user device 105 if such indications do not match readings from sensor 103. Additionally or alternatively, Secure Crypto-Processor 111 may prevent unauthorized users from controlling actuator 104 to lock/unlock the door.

In one embodiment, Secure Crypto-Processor 111 and user device 105 may share a secret key or password. Any commands or requests exchanged between user device 105 and device 101 would require, for example, calculating a message authentication code (MAC) using a keyed-hash message authentication code (HMAC) with the shared secret key. Only if the received requests from device 105 include the correct MAC would the Secure Crypto-Processor 111 read sensor data or send a command to the actuator. Similarly, Secure Crypto-Processor 111 encodes its replies to user device 105, such as any sensor data or actuator command acknowledgement, using the MAC. Because an unauthorized user and microcontroller 102 (including any malware in operating system 106 and application software 107) would not be able to generate the MAC, they cannot generate valid looking requests or responses nor can they improperly modify valid requests or responses.

In another embodiment, Secure Crypto-Processor 111 may be configured to support public-key or asymmetric cryptography. Secure Crypto-Processor 111 may store a private key that can be used to validate communications with users having an associated public key. Users of the door control system may be issued a public key. Multiple users may each have a different key. Secure Crypto-Processor 111 is capable of using the private key to encrypt/decrypt communications with the authorized users who have used a public key. Each such public key may be assigned a different policy. For example, each public key may be allowed to access only to certain specific sensor data, to control only certain actuators, or to be used only during defined periods. Any requested data or commands that do not meet the policy for that public key will be ignored. Each public key may be issued, activated, and revoked independently of the other public keys.

In another embodiment, Secure Crypto-Processor 111 may determine whether it fully trusts the microcontroller 102, operating system 106, and/or application software 107. Secure Crypto-Processor 111 comprises configuration registers 116 that hold various measurements in a shielded location in a manner that prevents tampering. The measurements consist of a cryptographic hash using a Secure Hashing Algorithm (SHA). The hash result of any two measurements should produce the same hash value only if the measurements are identical. The measurements may be associated with code properties, data structures, configuration information, etc. Secure Crypto-Processor 111 will not read and respond to requests for sensor data and will not send commands to trusted IO devices unless a current measurement is identical to a stored measurement in a configuration register 116. This prevents malware from attacking the operating system 106 or application software 107 and issuing improper requests or commands since Secure Crypto-Processor 111 will detect changes in the operating system 106 or application software 107 when the associated configuration register 116 value is different.

It will be understood that all components of a device 101 do not need to be controlled through Secure Crypto-Processor 111. Instead, only security-relevant IO components need be connected directly to the Secure IO pins of Secure Crypto-Processor 111. For example, in the door-controller embodiment, additional entryway devices, such as a video camera or doorbell, do not require the type of trusted IO control provided by Secure Crypto-Processor 111 and, therefore, can be connected to microcontroller 102 through device interface 106 or any other IO interface.

Figure 2:
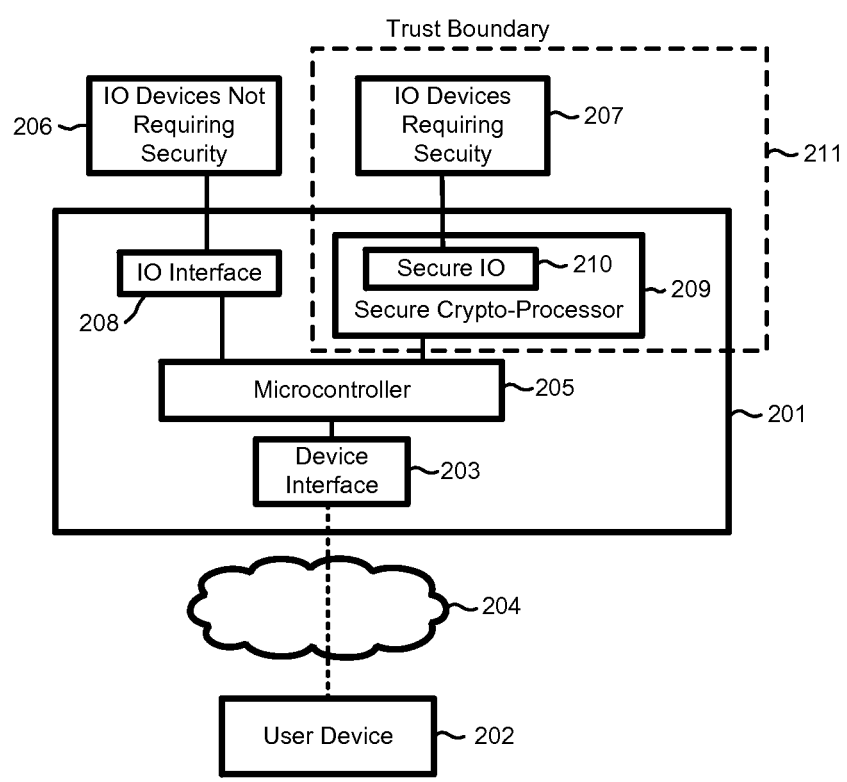
FIG. 2 is a block diagram illustrating how different IO devices may be connected to a device based upon their relevant security requirements.

FIG. 2 is a block diagram illustrating how different IO devices may be connected to a device 201 based upon their relevant security requirements. Device 201 may be an IoT device in one embodiment, such as an Internet-connected door controller, appliance, machine, equipment, heating/air conditioning system, vehicle, etc. Device 201 may be accessed by remote user devices 202 via device interface 203 and network 204. User device 202 may be, for example, a desktop, laptop, or tablet computer, workstation, smartphone, personal digital assistant, or other network-accessible device.

Microcontroller 205 processes requests and commands received from user device 202 and provides requested information to authorized users. Device 201 may be coupled to IO devices that fall within two broad categories—IO devices not requiring security 206 and IO device requiring security 207 (i.e., trusted IO devices). IO devices not requiring security 206 may include, for example, the operational status of an appliance, the position of a switch, the on/off status of an indicator light, etc. Microcontroller 205 communicates with IO devices that do not require security 206 via IO interface 208. Security for communications with IO devices that do not require security 207 is controlled by the operating system and application software running on microcontroller 205. If microcontroller 205 is subject to a malware attack, then unauthorized access to the IO devices that do not require security 206 is possible.

The IO devices requiring security 207 may include any sensor, actuator, or other device associated with, for example, health or safety functions and operations, personal or confidential data, etc. Microcontroller 205 communicates with security-relevant IO devices 207 using Secure Crypto-Processor 209. As discussed above, if Secure Crypto-Processor 209 determines that a request meets the relevant security policy, then data may be exchanged with the security-relevant IO devices 207 via Secure IO 210. Because of the overhead required (e.g., password/security key encryption operations) and the limited resources available on Secure Crypto-Processor 209 (e.g., a fixed number of Secure IO pins), only security-relevant IO devices 207 communicate using Secure Crypto-Processor 209 to protect such devices from malware and other attacks or unauthorized access.

Using Secure Crypto-Processor 209 in this way establishes a narrowly defined trust boundary 211 that encompasses devices that are isolated from direct communication with microcontroller 205. Accordingly, microcontroller 205 is not required to maintain security for such communications. If an unauthorized user attempts to access information from device 201, Secure Crypto-Processor 209 will prevent communications with the unauthorized user device 202, which prevents improper access to security-relevant IO devices 207; however, microcontroller 205 may provide information associated with non-secure JO devices 206 to the unauthorized user device 202.

Figure 3:
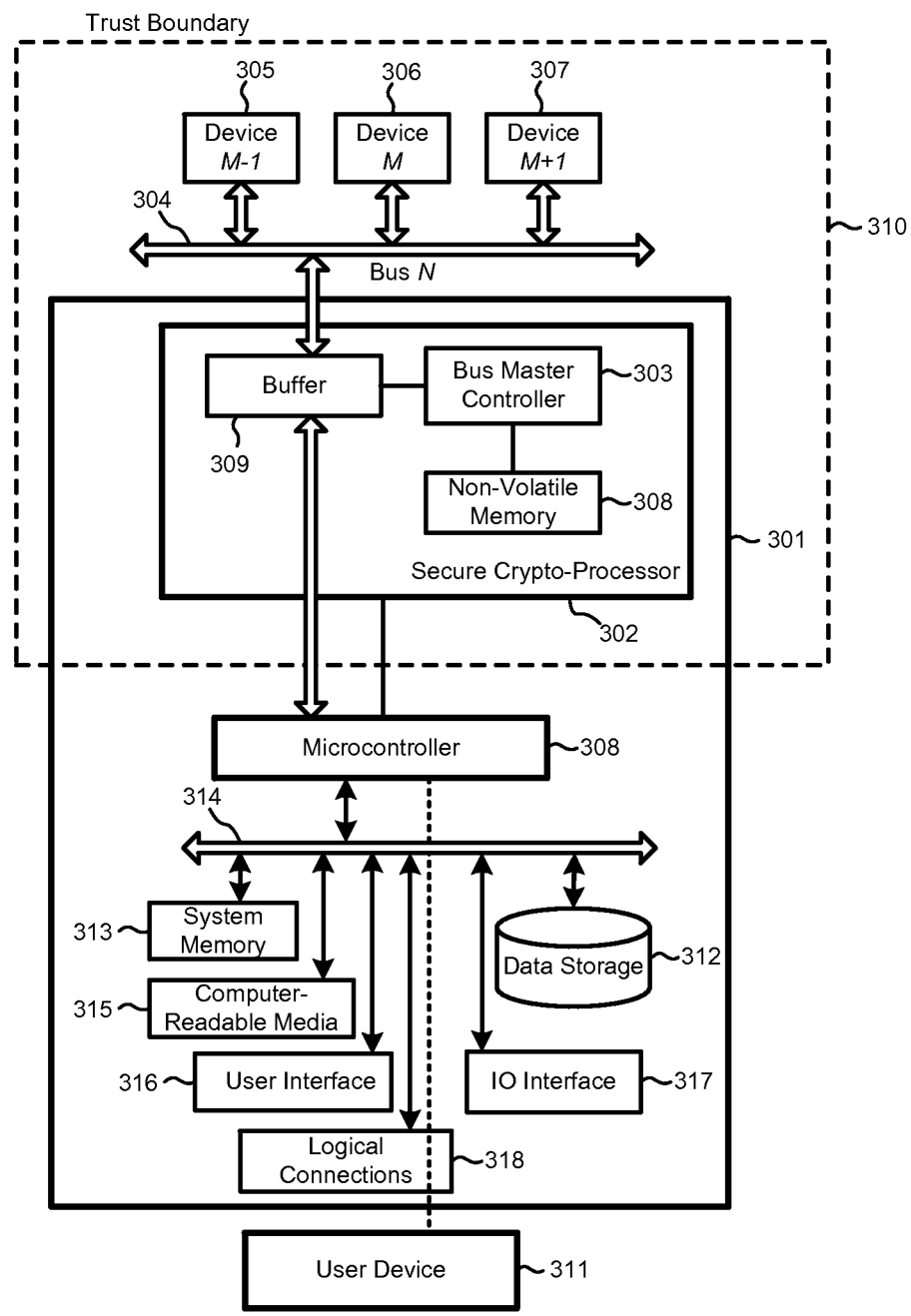
FIG. 3 is a block diagram of a device using a Secure Crypto-Processor for trusted data exchange allowing anything from simple one-bit data units to complex multi-byte block data transfers.

FIG. 3 is a block diagram of a device 301 using a Secure Crypto-Processor 302 for trusted data exchange allowing anything from simple one-bit data units to complex multi-byte block data transfers. Secure Crypto-Processor 302 comprises bus master controller 303 for secure bus 304, such as an SPI (Serial Peripheral Interface), I2C (Inter-IC), or an asynchronous serial interface bus. Bus master controller 303 is capable of addressing multiple independent IO devices 305-307 on bus 304. Accordingly, Secure Crypto-Processor 302 provides an isolated bus master 303, bus 304, and devices 305-307 that do not directly interact with device microcontroller 308. Similar to the use of Secure IO pins, Secure Crypto-Processor 302 can enforce authentication and other policies on transactions with the individual devices 305-307 on bus 304 using bus master controller 303. In this embodiment, Secure Crypto-Processor 302 acts as a gatekeeper that provides identity, authentication, authorization and attestation functionality for microcontroller 308 and device 301.

In one embodiment, bus master controller 303 may be integrated into the Secure Crypto-Processor hardware or firmware and is initialized and operated by the Secure Crypto-Processor 302 autonomously. The address range on bus 304 may be mapped to the NV storage range of Secure Crypto-Processor 302. The Secure Crypto-Processor manufacturer may associate the bus master to a sub range within the NV indices. In the case of I2C, which uses seven-bit addresses, all possible I2C devices on a data bus would be addressable over the storage indices 00000-0007F. A device manufacturer would provision the NV indices in non-volatile memory 319 for the matching devices 305-307 on bus 304. For example, if an I2C device M 306 with the address 0x58 is attached to trusted bus 304, the device manufacturer would provision NV index 0x01F00058 and set access policies for device M 306. Once set by the manufacturer, this NV index cannot be able to be removed or reconfigured by the device owner.

Secure Crypto-Processor 302 may further comprise a data buffer or register 309. Microcontroller 308 may write data to buffer 309 and provide an associated NV index to Secure Crypto-Processor 302. The NV index specifies a value N+M, which corresponds to a particular data bus N 304 and device M 306. Bus master controller 303 then sends the data in buffer 309 to device M 306. In a similar manner, microcontroller 308 may provide an NV index to Secure Crypto-Processor 302 with a read instruction. Bus master controller 303 then reads data from the device M 306 on data bus N 304 that corresponds to the NV index. Secure Crypto-Processor 302 further verifies that any policies associated with the NV index have been met before allowing data to be read from or written to device M 306. Using the NV indices, the bus master policies may be defined as described above for the Secure IO pins. This may include, for example, verifying the integrity of data stored to buffer 309 using shared secret keys, passwords, public-private key exchange, etc.

Secure Crypto-Processor 302 and bus master controller 303 provide physical separation between microcontroller 308 and devices 305-307. Data bus N 304 provides a private bus system that can only be accessed by Secure Crypto-Processor 302. Accordingly, the Secure Crypto-Processor trust boundary 310 encompasses devices that are isolated from direct communication with microcontroller 308 and/or user device 311. Therefore, devices within Secure Crypto-Processor trust boundary 310 are further protected from any malware or other attacks on microcontroller 308.

In an example embodiment, an NV index may correspond to an address for a terminal-style device 306 having a screen and a keyboard. Microcontroller 308 (or any remote third party at user device 311 capable of communicating with Secure Crypto-Processor 302 through the operating system and/or application software running on microcontroller 308) can satisfy the authorization policy for that NV index and can issue a write of complex data to the device. Secure Crypto-Processor 302 will verify that the incoming data is authorized and, if verification is successful, will send the complex data out on bus 304 to the destination device for device 306 to receive. If the write command was not properly authorized, Secure Crypto-Processor 302 will not send the data on bus 304 and there is no way for microcontroller 308 to circumvent the Secure Crypto-Processor 302. Microcontroller 308 cannot authorize the write itself since it does not have direct access to bus 304.

In other embodiments, incoming data may be encrypted and Secure Crypto-Processor 302 will decrypt the data before sending the data out to the destination device on bus 304. In that scenario, microcontroller 308 has no idea what data was actually sent since it does not have access to bus 304. Once the device receives the data, it will act on the data accordingly, such as displaying the data in the case of a terminal-style device. In this way, the user knows that any data that shows up on that screen was provided from an authorized source and, therefore, can be trusted independent of the security state of the device itself. In one embodiment, microcontroller 308 may stop future communications from a particular user device 311 from reaching the Secure Crypto-Processor 302, if the data sent from that user device 311 was not successfully written to the display. Such a failure would raise warning flags of likely unauthorized content and may trigger the source user device 311 to be blacklisted and/or to be scheduled for service.

Once the data is displayed, the user can read the message and provide feedback, such as by using buttons on the device 306. Once the user indicates to the device that the response is complete (e.g., by pressing "enter" or "send"), Secure Crypto-Processor 302 may read the response back from the terminal device 306. In one embodiment, the intended receiver of the data may request that Secure Crypto-Processor 302 encrypt any response for privacy reasons. A session authorization may indicate to the remote party that the data was actually read from the proper address on the secure bus 304.

It will be understood that device 301 is only one example of a suitable computing environment and is not intended to suggest any limitation as to the scope of use or functionality of the invention, which is operational with numerous other general purpose or special purpose computing system environments or configurations. Examples of well-known computing systems, environments, and/or configurations that may be suitable for use with the systems and methods disclosed herein include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

Embodiments may be described in the general context of computer-executable instructions, such as program modules, being executed by a computer. Generally, program modules include routines, programs, objects, components, data structures, and so forth, which perform particular tasks or implement particular abstract data types. The systems and methods may be practiced in distributed computing environments where tasks are performed by remote processing devices that are linked through a communications network. In a distributed computing environment, program modules may be located in local and/or remote computer storage media including memory storage devices.

Device 301 may comprise additional components, including, but not limited to, various hardware components, such as data storage 312, system memory 313, and system bus 314 that couples various system components to microprocessor 308. The system bus 314 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and Mezzanine bus.

Device 301 may include a variety of computer-readable media 315, which may be any available media that can be accessed by the microcontroller 308 and includes both volatile and nonvolatile media, and removable and non-removable media, but excludes propagated signals. By way of example, and not limitation, computer-readable media 315 may comprise computer storage devices and media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by microcontroller 308. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage 312 and/or system memory 313 may include computer storage media in the form of volatile and/or nonvolatile memory such as read only memory (ROM) and random access memory (RAM). A basic input/output system (BIOS), containing the basic routines that help to transfer information between elements within device 301, such as during start-up, is typically stored in ROM. RAM typically contains data and/or program modules that are immediately accessible to and/or presently being operated on by microcontroller 308. By way of example, and not limitation, data storage 312 holds an operating system, application programs, and other program modules and program data.

Data storage 312 may also include other removable/non-removable, volatile/nonvolatile computer storage media. By way of example only, data storage 312 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 3, provide storage of computer-readable instructions, data structures, program modules and other data for device 301.

A user may enter commands and information through a user interface 316, which may provide remote access to a user device 311 or local access using an input device such as a keypad, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to microcontroller 308 through a user input interface 316 that is coupled to the system bus 314. Alternatively, input devices may be connected by other IO interface 317, such as a parallel port, game port, or a universal serial bus (USB). A monitor or other type of display device (not shown) may be connected to the system bus 314 via an interface, such as a video interface. The monitor may also be integrated with a touch-screen panel or the like. Note that the monitor and/or touch screen panel can be physically coupled to a housing in which device 301 is incorporated, such as in a tablet-type personal computer. In addition, computers such as device 301 may also include other peripheral output devices such as speakers and printer, which may be connected through an output peripheral interface or the like.

Device 301 may operate in a networked or cloud-computing environment using logical connections 318 to communicate with one or more remote devices, such as a remote computer or user device 311. The remote computer may be a personal computer, a server, a router, a network PC, a peer device or other common network node. The logical connections depicted in FIG. 3 may include one or more local area networks (LAN) and one or more wide area networks (WAN), but may also include other networks. Such networking environments are commonplace in offices, enterprise-wide computer networks, intranets and the Internet. In other embodiments, logical connections 318 may comprise a modem or other means for establishing communications over a network. The modem, which may be internal or external, may be connected to the system bus 314 via logical connections 318 or other appropriate mechanism. A wireless networking component such as comprising an interface and antenna may be coupled via logical connections 318 or other suitable device such as an access point or peer computer to a network. In a networked environment, program modules depicted relative to device 301, or portions thereof, may be stored in a remote memory storage device. It may be appreciated that the network connections shown are exemplary and other means of establishing a communications link between the computers may be used.

It will be understood that the Secure Crypto-Processor may be realized in different forms, such as hardware or firmware. In one embodiment, a Trusted Platform Module (TPM) may be used as the Secure Crypto-Processor described herein. The TPM may be used to ensure trustworthiness of software that is run on a computer or processor-based device. TPMs are hardware microcontrollers that store cryptographic keys, passwords, and digital certificates. Once initialized, TPMs may be used to generate digital signing and encryption keys, allowing confirmation that messages are from the device that the message claims to be from. Most TPMs conform to the Trusted Computing Group (TCG) standard, presently available at https://www.trustedcomputinggroup.org/home. TPM hardware or firmware may be incorporated into computing platforms to establish trust for the code that is executed by a platform. In such an embodiment that uses a TPM as the Secure Crypto-Processor, a bus master controller may be incorporated into the TPM or the General Purpose Input/Output (GPIO) on the TPM may be used as a Secure IO as described herein.

In other embodiments, such as in ARM®-based platforms, TrustZone® technology may be used to provide the operations of the Secure Crypto-Processor described herein. ARM-based platforms provide a special CPU mode called "secure mode" in addition to the normal mode, thereby establishing the notions of a "secure world" and a "normal world". Software running in the "secure world" may provide the Secure Crypto-Processor functionality.

Figure 4:
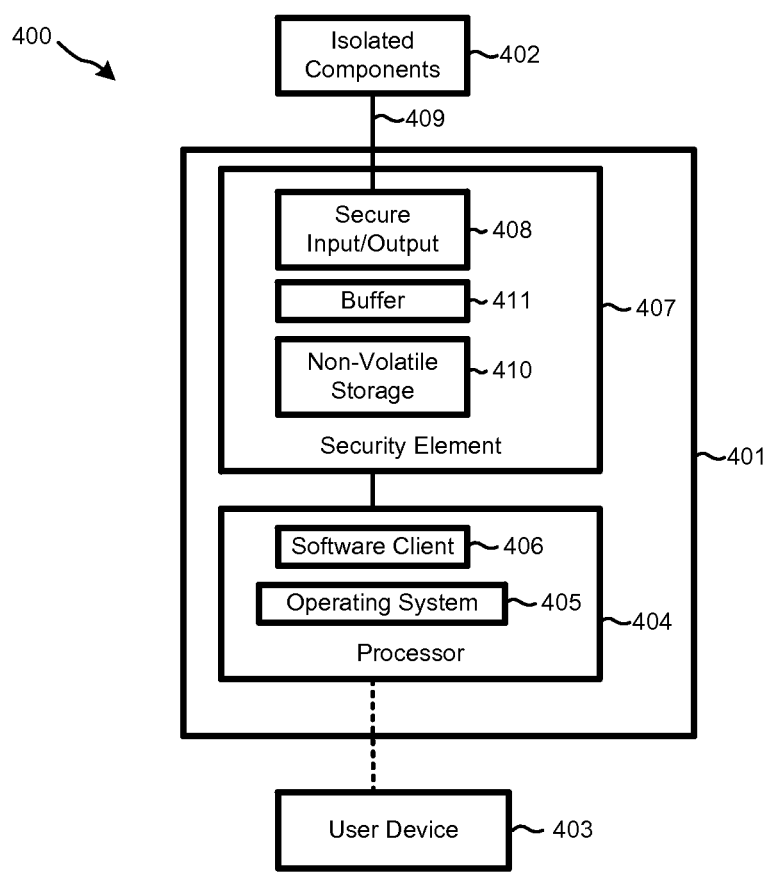
FIG. 4 illustrates one embodiment of a system for isolating secure input/output devices.

FIG. 4 illustrates one embodiment of a system 400 for isolating secure input/output devices. System 400 comprises a device 401 that is coupled to isolated components 402 and a remote user device 403. Device 401 comprises a processor 404 running an operating system 405 and a one or more software clients 406. Processor 404 is coupled to security element 407. Secure input/output interface 408 provides connections 409 between the security element 407 and isolated components 402. The security element 407 is configured to allow only authorized communications between the processor 404 and the isolated components 402.

In one embodiment, security element 407 may be a TPM and the secure input/output interface 408 is a bus master controller on the TPM. The connections 409 may be, for example, a secure bus between the security element 407 and the isolated components 402. Buffer 411 is configured to store data from the processor 404 and to read and/or write data to the isolated components 402 via the secure bus 409 under control of the bus master controller 408.

In another embodiment, security element 407 may be a TPM and secure input/output interface 408 may be a GPIO on a TPM 407. GPIO pins may provide the connections 409 between the security element 407 and the isolated components 402.

In one embodiment, processor 404 and security element 407 may be resident on the same computing device 401. Security element 407 may be defined by firmware stored on the computing device. In other embodiments, processor 404 and security element 407 may be separate hardware components.

A non-volatile memory or storage 410 on security element 407 may store one or more indexed values that correspond to policies enforced by the security element 407. The policies may control access to the isolated components 402. For example, the policies may define an identity, authentication, authorization, or attestation of one or more of the isolated components 402, security element 407, processor 404, or a remote user device 403.

Figure 5:
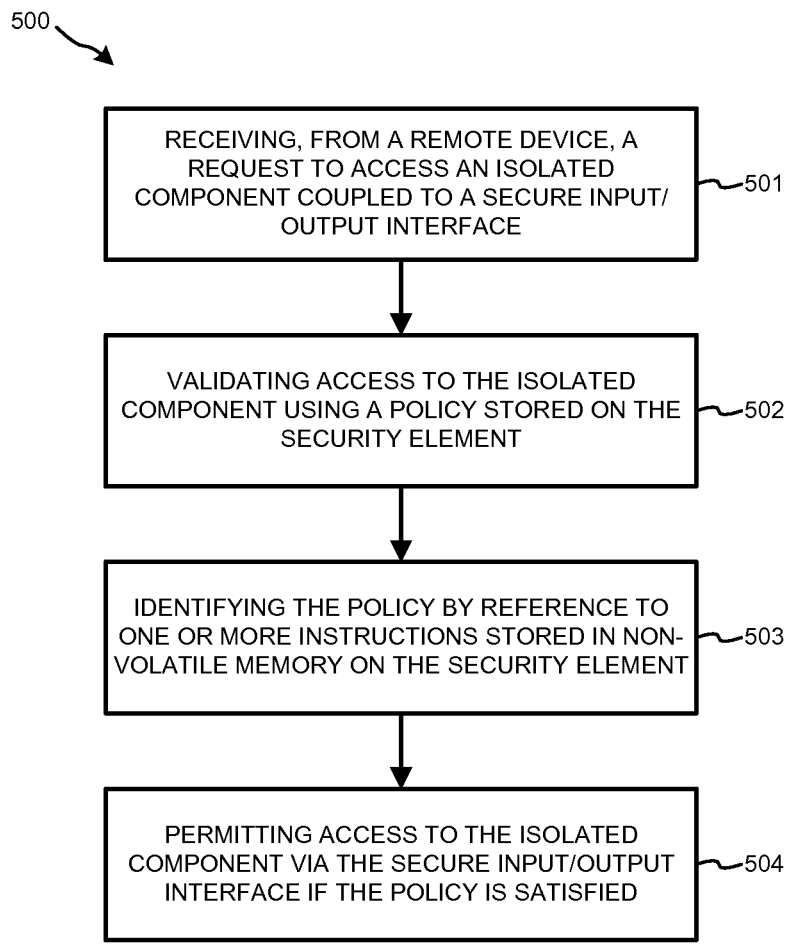
FIG. 5 is a flowchart illustrating one embodiment of a process or method that controls access to isolated components using a security element.

FIG. 5 is a flowchart illustrating one embodiment of a process or method 500 that controls access to isolated components using a security element. The method may be performed, for example, on a computing system comprising a processor, security element, and secure input/output interface. The processor and security element may be separate hardware devices, wherein the secure input/output interface is a component of the security element. Alternatively, the processor and security element may be components of a single hardware device, wherein the security element is defined by firmware stored on the hardware device.

In step 501, a request to access an isolated component coupled to the secure input/output interface is received from a remote device, such as a remote user device. In one embodiment, the request to access the isolated component may be, for example, a request to read data from the isolated component, a request to write data to the isolated component, or a command to be sent to the isolated component.

In step 502, access to the isolated component is validated using a policy stored on the security element. Access to the isolated component may be validated using a policy stored on the security element. The policy may employ, for example, a cryptographic process to determine an identity, authentication, authorization, or attestation of one or more of the isolated components, security element, processor, or a remote user device.

In step 503, the policy is identified, for example, by reference to one or more instructions stored in non-volatile memory on the security element.

In step 504, access to the isolated component via the secure input/output interface is permitted if the security element policy is satisfied.

In one embodiment, data from the processor is stored to a buffer on the security element. When the policy permits access, the data is written from the buffer to a secure bus that couples the security element to the isolated component under control of a bus master on the security element. For example, the security element may be a TPM and the secure input/output interface is a bus master controller on the TPM, In another embodiment, the security element may be a TPM and the secure input/output interface is a GPIO on the TPM. Access is permitted to the isolated component via GPIO pins that connect the security element and the isolated components.

Operating systems may provide security features to guard against attacks initiated from a public network, such as the Internet. Viruses, worms, Trojan horses, identity theft, software piracy, malicious attacks, and threats of data destruction. Such security features are ineffective if the operating system itself has been corrupted, infected, or the victim of a malicious attack. Advantageously, a Secure Crypto-Processor may be used to avoid, defeat, or minimize such attacks. This may be accomplished by using IO lines on the Secure Crypto-Processor to drive devices that have a high integrity requirement or to do attestation of sensor readings. Advantageously, Secure Crypto-Processor authorization policies may be used to enforce policies on interaction with IO devices.

An example system for isolating secure input/output devices comprises a processor, a security element, and a secure input/output interface on the security element. The secure input/output provides connections between the security element and isolated components. The security element is configured to allow only authorized communications between the processor and the isolated components.

The security element may be a Trusted Platform Module (TPM) and the secure input/output interface may be a bus master controller on the TPM, wherein the example system further comprises a secure bus providing the connections between the security element and the isolated components.

The system may further comprise a buffer on the security element. The buffer configured to store data from the processor and to write data to the isolated components via the secure bus under control of the bus master controller. The buffer additionally or alternatively configured to store data from the isolated components via the secure bus and to write data to the processor under control of the bus master controller.

The security element may be a Trusted Platform Module (TPM) and the secure input/output interface may be a General Purpose Input/Output (GPIO) on the TPM, wherein the example system further comprises GPIO pins providing the connections between the security element and the isolated components.

The processor and security element may be resident on the same computing device, wherein the security element is defined by firmware stored on the computing device.

The example system may further comprise non-volatile memory on the security element. The non-volatile memory storing one or more indexed values, the indexed values corresponding to policies enforced by the security element. The policies may control access to the isolated components. The policies may define an identity, authentication, authorization, or attestation of one or more of the isolated components, security element, processor, or a remote user device.

A example method may be performed on a computing system comprising a processor, security element, and secure input/output interface. The method comprises receiving, from a remote device, a request to access an isolated component coupled to the secure input/output interface; validating access to the isolated component using a policy stored on the security element; and permitting access to the isolated component via the secure input/output interface if the security element policy is satisfied.

The request to access the isolated component may be a request to read data from the isolated component, a request to write data to the isolated component, or a command to be sent to the isolated component.

The method may further comprise identifying the policy by reference to one or more instructions stored in non-volatile memory on the security element.

The processor and security element may be separate hardware devices, and the secure input/output interface may be a component of the security element.

The processor and security element may be components of a single hardware device, wherein the security element is defined by firmware stored on the hardware device.

The method may further comprise storing data from the processor to a buffer on the security element; and when the policy permits access, writing the data from the buffer to a secure bus that couples the security element to the isolated component under control of a bus master on the security element.

The security element used in the method may be a Trusted Platform Module (TPM) and the secure input/output interface may be a bus master controller on the TPM, The security element used in the method may be a Trusted Platform Module (TPM) and the secure input/output interface is a General Purpose Input/Output (GPIO) on the TPM, and the method may further comprise permitting access to the isolated component via GPIO pins that connect the security element and the isolated components.

The method step of validating access to the isolated component using a policy stored on the security element may further comprise employing a cryptographic process to determine an identity, authentication, authorization, or attestation of one or more of the isolated components, security element, processor, or a remote user device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for isolating secure input/output devices, comprising:
   a security element;
   a buffer on the security element, the buffer configured to store data received from a processor, wherein an index associated with the stored data is also received from the processor;
   a memory on the security element, the memory configured to store one or more index values corresponding to policies enforced by the security element, wherein each of the index values is associated with an isolated component connected to the security element via a secure bus, the policies used to control access to the isolated components; and
   a bus master controller on the security element, the bus master controller configured to control writing data to isolated components associated with the received index when the security element verifies compliance with the policies corresponding to the received index.

2. The system of claim 1, wherein the security element is a Trusted Platform Module (TPM).

3. The system of claim 1, further comprising:
   the buffer on the security element configured to store data from the isolated components via the secure bus and to write data to the processor under control of the bus master controller.

4. The system of claim 1, wherein the security element is a Trusted Platform Module (TPM) comprising a General Purpose Input/Output (GPIO) on the TPM, the system further comprising:
   GPIO pins providing connections between the security element and the isolated components.

5. The system of claim 1, wherein the processor and security element are resident on the same computing device, and wherein the security element is defined by firmware stored on the computing device.

6. The system of claim 1, wherein the memory on the security element is non-volatile memory.

7. The system of claim 1, wherein the policies define an identity, authentication, authorization, or attestation of one or more of the isolated components, security element, processor, or a remote user device.

8. A system for isolating secure input/output devices, comprising:
   a secure crypto-processor;
   a buffer on the secure crypto-processor, the buffer configured to store data received from a microcontroller, wherein an index associated with the stored data is also received from the microcontroller;
   a memory on the secure crypto-processor, the memory configured to store one or more index values corresponding to policies enforced by the secure crypto-processor, wherein each of the index values is associated with an isolated component connected to the secure crypto-processor via a secure bus, the policies used to control access to the isolated components; and
   a bus master controller on the secure crypto-processor, the bus master controller configured to control writing data to isolated components associated with the received index when the secure crypto-processor verifies compliance with the policies corresponding to the received index.

9. The system of claim 8, wherein the secure crypto-processor is a Trusted Platform Module (TPM).

10. The system of claim 8, further comprising:
    the buffer on the secure crypto-processor configured to store data from the isolated components via the secure bus and to write data to the microcontroller under control of the bus master controller.

11. The system of claim 8, wherein the secure crypto-processor is a Trusted Platform Module (TPM) comprising a General Purpose Input/Output (GPIO) on the TPM, the system further comprising:
    GPIO pins providing connections between the secure crypto-processor and the isolated components.

12. The system of claim 8, wherein the microcontroller and secure crypto-processor are resident on the same computing device, and wherein the secure crypto-processor is defined by firmware stored on the computing device.

13. The system of claim 8, wherein the memory on the secure crypto-processor is non-volatile memory.

14. The system of claim 8, wherein the policies define an identity, authentication, authorization, or attestation of one or more of the isolated components, secure crypto-processor, microcontroller, or a remote user device.

* * * * *